United States Patent
Tanaka et al.

(10) Patent No.: US 12,556,279 B2
(45) Date of Patent: Feb. 17, 2026

(54) REPEATER AND MONITORING METHOD

(71) Applicant: Mitsubishi Electric Corporation, Tokyo (JP)

(72) Inventors: Mamiko Tanaka, Tokyo (JP); Yoshiaki Konishi, Tokyo (JP); Kenji Ishii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 236 days.

(21) Appl. No.: 18/287,300

(22) PCT Filed: Apr. 28, 2021

(86) PCT No.: PCT/JP2021/016963
§ 371 (c)(1),
(2) Date: Oct. 18, 2023

(87) PCT Pub. No.: WO2022/230103
PCT Pub. Date: Nov. 3, 2022

(65) Prior Publication Data
US 2024/0204875 A1 Jun. 20, 2024

(51) Int. Cl.
*H04B 10/29* (2013.01)
*H04B 10/075* (2013.01)

(52) U.S. Cl.
CPC .......... *H04B 10/29* (2013.01); *H04B 10/075* (2013.01)

(58) Field of Classification Search
None
See application file for complete search history.

(56) References Cited

U.S. PATENT DOCUMENTS

| 4,019,048 A * | 4/1977 | Maione ................. H04B 10/29 |
| | | 250/214 AG |
| 2002/0131101 A1 | 9/2002 | Ohira et al. |
| 2019/0190603 A1* | 6/2019 | Asada ................. H04B 10/516 |

FOREIGN PATENT DOCUMENTS

| JP | 2005-333286 A | 12/2005 |
| JP | 2014-165574 A | 9/2014 |
| WO | 2018/003912 A1 | 1/2018 |

OTHER PUBLICATIONS

Office Action issued Nov. 21, 2023 in Japanese Patent Application No. 2023-516947, 6 pages.

(Continued)

*Primary Examiner* — David W Lambert
(74) *Attorney, Agent, or Firm* — XSENSUS LLP

(57) ABSTRACT

A regenerative relay transponder includes: an optical receiving unit that receives an optical signal from a transmitting device as a reception optical signal and converts the reception optical signal into an electrical signal; an electrical-signal processing unit that executes predetermined processing on the electrical signal; an optical transmitting unit that generates a transmission optical signal by converting the electrical signal subjected to the predetermined processing into an optical signal and transmits the transmission optical signal; and a monitoring unit that monitors the predetermined processing by the electrical-signal processing unit, wherein the monitoring unit accumulates in a storage unit monitoring data, which indicates the result of the monitoring, over a predetermined period and causes a communication unit to transmit the monitoring data accumulated over the predetermined period as transmission data to the transmitting device.

20 Claims, 6 Drawing Sheets

(56) References Cited

OTHER PUBLICATIONS

Extended European Search Report issued May 16, 2024 in European Patent Application No. 21939264.4, 11 pages.
International Search Report and Written Opinion mailed on Jul. 20, 2021, received for PCT Application PCT/JP2021/016963, filed on Apr. 28, 2021, 9 pages including English Translation.

* cited by examiner

REPEATER AND MONITORING METHOD

CROSS-REFERENCE TO RELATED APPLICATION

This application is based on PCT filing PCT/JP2021/016963, filed Apr. 28, 2021, the entire contents of which are incorporated herein by reference.

TECHNICAL FIELD

The disclosure relates to a repeater and a monitoring method.

BACKGROUND ART

In wavelength-division multiplexing systems, the transmission distance of a single transponder is limited. For this reason, when a signal is transmitted over a distance greater than the transmission distance of the transponder, a regenerative relay transponder is used to regenerate and relay the signal.

Conventional regenerative relay transponders require different processing than that in ordinary transponders. For example, since overhead data transmitted from an ordinary transponder may differ from an expected value, the regenerative relay transponder described in Patent Literature 1 uses undefined overhead for transmission.

The increase in demands for information and communications has led to the need for large-capacity optical transmission in recent years. Therefore, the transmission speed per wavelength of a transponder has increased from 10 Gbps to 40 Gbps, 100 Gbps, and even 400 Gbps.

PRIOR ART REFERENCE

Patent Reference

Patent Literature 1: Japanese Patent Application Publication No. 2005-333286

SUMMARY OF THE INVENTION

Problem to be Solved by the Invention

However, in the case of a conventional regenerative relay transponder, a higher transmission rate requires an increase in monitoring control speed, which complicates the device configuration.

Accordingly, it is an object of one or more aspects of the disclosure to achieve high-speed monitoring control with a simple configuration.

Means of Solving the Problem

A repeater according to an aspect of the disclosure includes: an optical receiving unit configured to receive an optical signal from a transmitting device as a reception optical signal and convert the reception optical signal into an electrical signal; an electrical-signal processing unit configured to execute predetermined processing on the electrical signal; an optical transmitting unit configured to generate a transmission optical signal by converting the electrical signal subjected to the predetermined processing into an optical signal and transmitting the transmission optical signal; a storage unit configured to store data; a communication unit configured to transmit and receive data; and a monitoring unit configured to monitor the predetermined processing by the electrical-signal processing unit, wherein the monitoring unit accumulates in the storage unit monitoring data over a predetermined period and causes the communication unit to transmit the monitoring data accumulated over the predetermined period as transmission data to the transmitting device, the monitoring data being data indicating a result of the monitoring.

A monitoring method according to an aspect of the disclosure, includes: receiving an optical signal from a transmitting device as a reception optical signal; converting the reception optical signal into an electrical signal; executing predetermined processing on the electrical signal; generating a transmission optical signal by converting the electrical signal subjected to the predetermined processing into an optical signal; transmitting the transmission optical signal; monitoring the predetermined processing; accumulating monitoring data over a predetermined period, the monitoring data being data indicating a result of the monitoring; and transmitting the monitoring data accumulated over the predetermined period to the transmitting device as transmission data.

Effects of the Invention

According to one or more aspects of the disclosure, high-speed monitoring control can be achieved with a simple configuration.

MODE FOR CARRYING OUT THE INVENTION

First Embodiment

Figure 1:
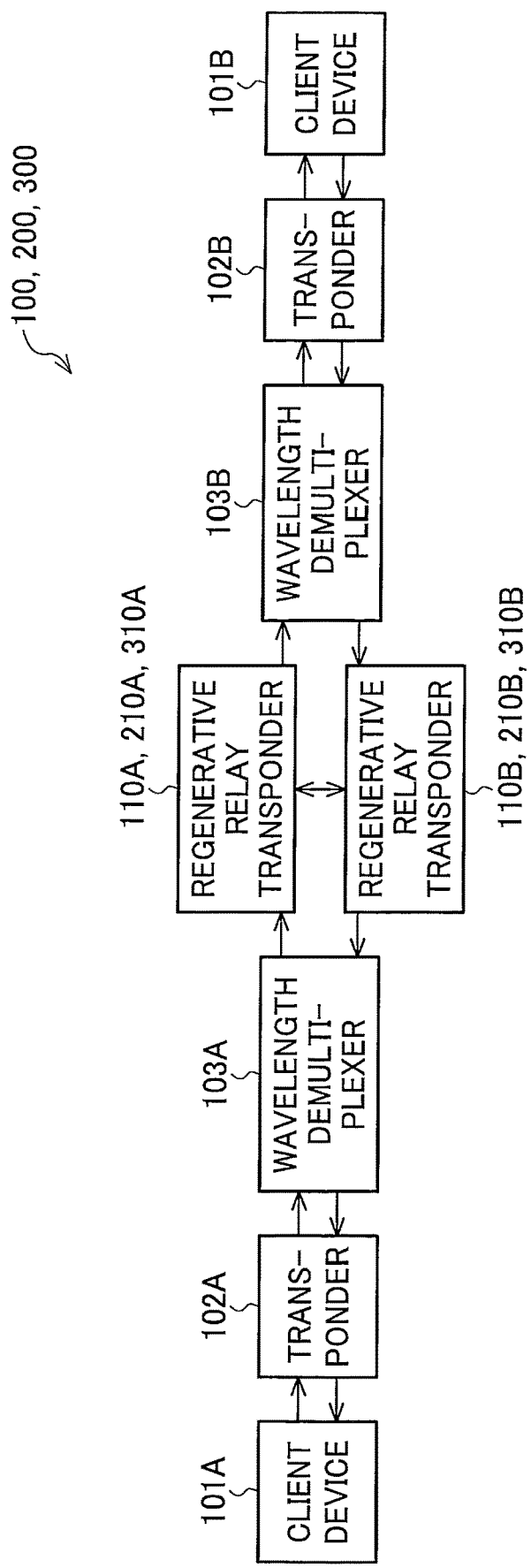
FIG. 1 is a block diagram illustrating a configuration of a wavelength-division multiplexing system including regenerative relay transponders serving as repeaters according to first to third embodiments.

FIG. 1 is a block diagram illustrating a configuration of a wavelength-division multiplexing system 100 including regenerative relay transponders 110A and 110B serving as repeaters according to the first embodiment.

The wavelength-division multiplexing system 100 includes customer client devices 101A and 101B, transponders 102A and 102B, wavelength demultiplexers 103A and 103B, and regenerative relay transponders 110A and 110B.

In the wavelength-division multiplexing system 100, for example, a client signal from the client device 101A is input to the transponder 102A, and the signal modulated by the transponder 102A is input to the wavelength demultiplexer 103A. The signal from the wavelength demultiplexer 103A is regenerated and relayed by the regenerative relay transponder 110A and is input to the transponder 102B through the wavelength demultiplexer 103B. The signal received by the transponder 102B is demodulated and transmitted to the customer client device 101B.

For example, if an abnormality occurs between the transponder 102A and the regenerative relay transponder 110A, the regenerative relay transponder 110A must send data on a backward defect indication (BDI) or a bit-interleaved parity (BIP-8) error to the transponder 102A serving as a transmitting device. If no particular action is taken, the regenerative relay transponder 110A will transmit data to the transponder 102B in the opposite direction.

Consequently, the regenerative relay transponder 110A transmits data to the paired regenerative relay transponder 110B to transmit the data to the opposing transponder 102A.

In this case, the regenerative relay transponder 110A needs to perform high-speed monitoring control, to sequentially acquire data such as BIP-8, to send the data to the regenerative relay transponder 110B at high speed, and to transfer the data to the transponder 102B. In the case where the high-speed monitoring control is replaced with low-speed monitoring control, in order to transfer all data, it is necessary to use a method to accumulate data over a predetermined period and report whether the data is new or not to the other transponder when the accumulated data is transmitted. Here, such a method is presented.

Here, since the regenerative relay transponders 110A and 110B have the same configuration, each of the regenerative relay transponders 110A and 110B is referred to as a regenerative relay transponder 110 when it is unnecessary to distinguish between them.

Since the client devices 101A and 101B have the same configuration, each of them is referred to as a client device 101 when it is unnecessary to distinguish between them.

Since the transponders 102A and 102B have the same configuration, each of them is referred to as a transponder 102 when it is unnecessary to distinguish between them.

Figure 2:
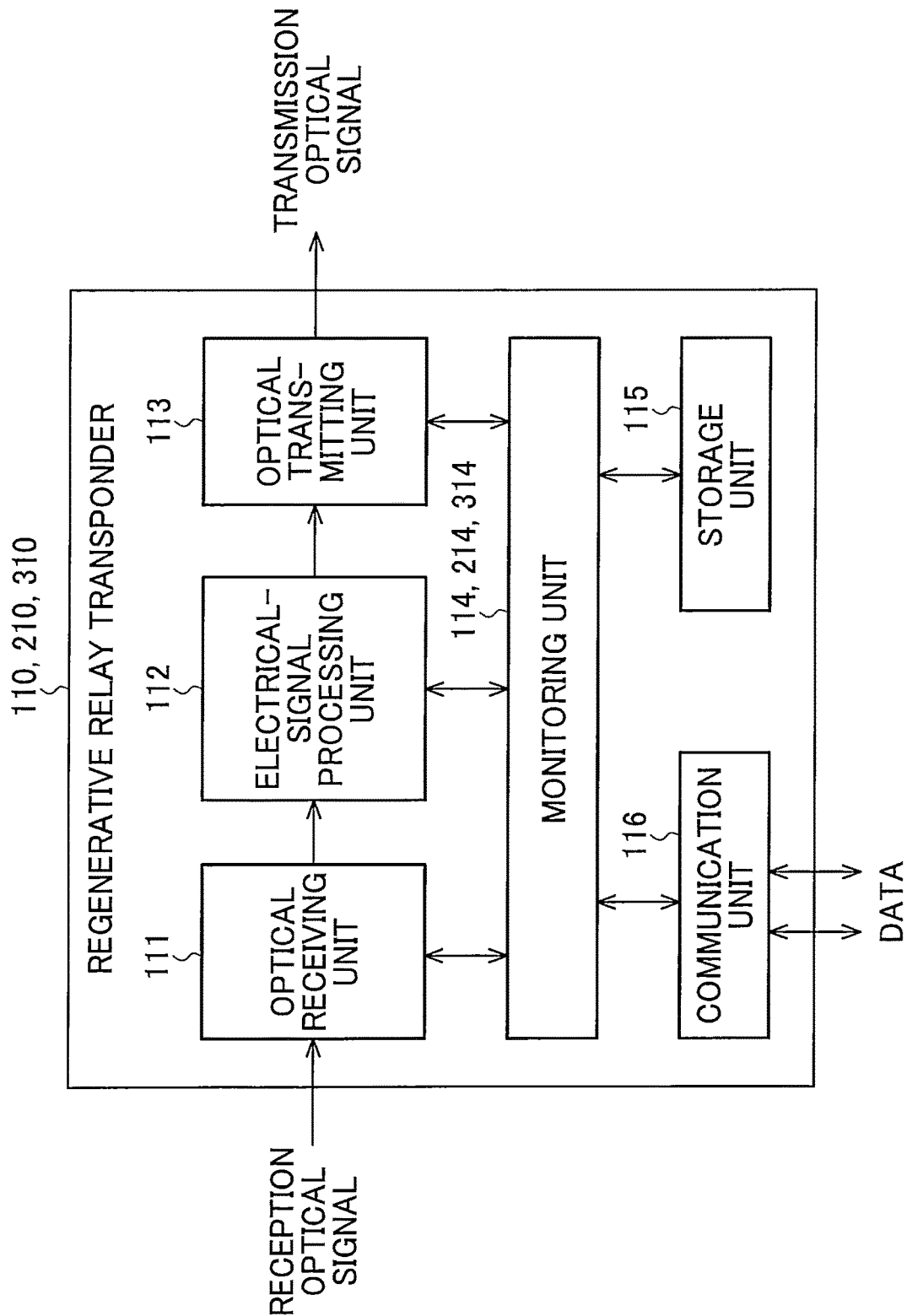
FIG. 2 is a block diagram schematically illustrating a functional configuration of the regenerative relay transponders according to the first to third embodiments.

Since the wavelength demultiplexers 103A and 103B have the same configuration, each of them is referred to as a wavelength demultiplexer 103 when it is unnecessary to distinguish between them, FIG. 2 is a block diagram schematically illustrating a functional configuration of the regenerative relay transponder 110.

The regenerative relay transponder 110 includes an optical receiving unit 111, an electrical-signal processing unit 112, an optical transmitting unit 113, a monitoring unit 114, a storage unit 115, and a communication unit 116.

The optical receiving unit 111 receives an optical signal and converts the optical signal into an electrical signal. The converted electrical signal is given to the electrical-signal processing unit 112. The optical signal received by the optical receiving unit 111 is also referred to as reception optical signal.

The electrical-signal processing unit 112 executes predetermined processing on an electrical signal from the optical receiving unit 111.

For example, the electrical-signal processing unit 112 demodulates original data by digitally converting an electrical signal from the optical receiving unit 111, executes predetermined processing such as abnormality detection, converts the processed digital signal into an analog signal, and gives the converted analog signal to the optical transmitting unit 113 as a transmission signal.

The optical transmitting unit 113 generates a transmission optical signal by converting the electrical signal subjected to the predetermined processing at the electrical-signal processing unit 112 into an optical signal, and transmits the transmission optical signal.

For example, the optical transmitting unit 113 converts a signal received from the electrical-signal processing unit 112 into an optical signal and transmits the optical signal.

Here, the transponder that transmits the optical signal is also referred to as the opposing transponder 102 or transmitting device.

The monitoring unit 114 monitors the predetermined processing executed by the electrical-signal processing unit 112. The monitoring unit 114 then accumulates monitoring data, which is data indicating the monitoring result, in the storage unit 115 over a predetermined period. The monitoring unit 114 causes the communication unit 116 to transmit the monitoring data accumulated over the predetermined period as transmission data to the transponder 102 that has transmitted the optical signal.

For example, when the electrical-signal processing unit 112 uses an electrical signal to detect the presence or absence of an abnormality in communication with the transponder 102 or the transmitting device and determines that there is an abnormality, the monitoring unit 114 causes the storage unit 115 to store data related to the abnormality as monitoring data.

When the electrical-signal processing unit 112 performs error correction of the electrical signal, the monitoring unit 114 causes the storage unit 115 to store data related to the error correction (for example, the number of errors corrected, etc.) as monitoring data.

Here, when an abnormality is detected by the electrical-signal processing unit 112, the monitoring unit 114 acquires the data in which the abnormality is detected from the electrical-signal processing unit 112 and stores the data in the storage unit 115.

The monitoring unit 114 accumulates data in which an abnormality is detected in the storage unit 115 over a predetermined period. Here, the predetermined period is, for example, ten milliseconds. The idea of wavelength-division multiplexing systems does not require real-time processing, and it is sometimes possible to calculate the data in which the abnormality was detected if the data is accumulated for ten milliseconds.

The monitoring unit 114 then sends the data accumulated over the predetermined period to a paired regenerative relay transponder 110 by using any frame format via the communication unit 116.

When the communication unit 116 receives data that is monitoring data from the paired regenerative relay transponder 110, the monitoring unit 114 causes the optical transmitting unit 113 to transmit the received data.

Here, the received data is transmitted as an optical signal to the transponder 102 serving as the transmitting device of the paired regenerative relay transponder 110. Here, the transmitting device of the paired regenerative relay transponder 110 is the transponder 102 serving as the receiving device that receives optical signals from the regenerative relay transponder 110 including the monitoring unit 114 that executes processing. In the example of FIG. 1, when the regenerative relay transponder 110A receives monitoring data as received data from the regenerative relay transponder 110B, the received data is transmitted to the transponder 102B.

Here, the monitoring unit 114 uses a general communication channel (GCC) to cause the optical transmitting unit 113 to transmit received data to the transponder 102 or the transmitting device.

For example, the monitoring unit 114 stores received data in a general communication channel 0 (GCC0) region in an optical transport unit (OTU) frame overhead and causes the optical transmitting unit 113 to transmit the stored data to the transponder 102.

Figure 3:
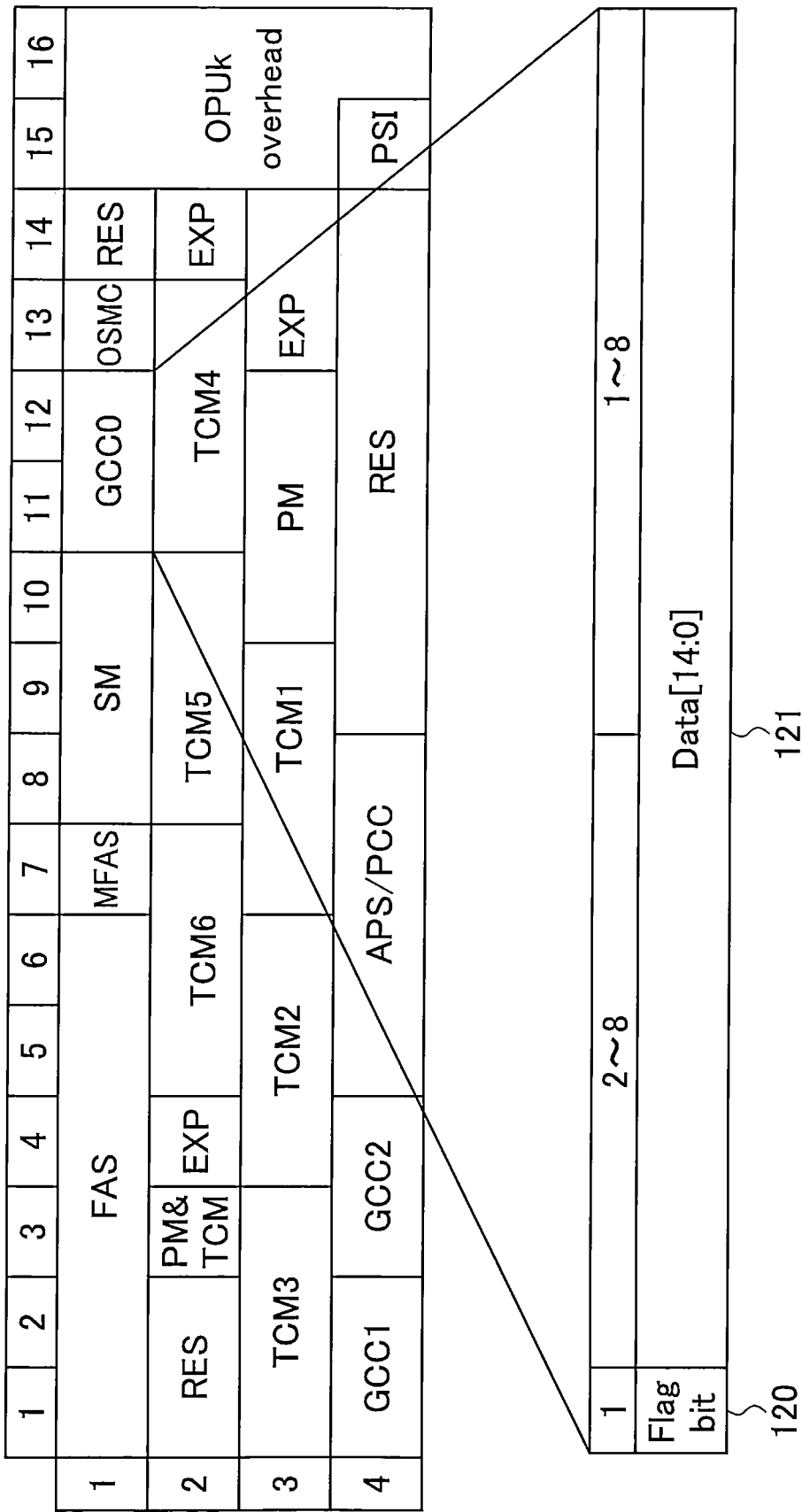
FIG. 3 is a schematic diagram illustrating overhead mapping of an OTUCn frame.

FIG. 3 is a schematic diagram illustrating the overhead mapping of an OTUCn frame with a bitrate of 100 Gbps×n (where n is a positive integer), which is an extended OTU frame.

For example, the monitoring unit 114 stores received data in a GCC0 data region 121 in the OTUCn frame overhead illustrated in FIG. 3.

When there is an update in the received data, the monitoring unit 114 inserts "1" into a GCC0 leading flag bit 120, and when there is no update in the received data, the monitoring unit 114 inserts "0" into the leading flag bit 120. In other words, the monitoring unit 114 inserts "1" in the leading flag bit 120 when the received data is transferred first and inserts "0" in the leading flag bit 120 while there is no update in the received data.

Therefore, when the transponder 102 receives an OTUCn frame in which "1" is inserted into the leading flag bit 120, the transponder 102 should start data reading, reset the counter, and read data from the data region 121.

As described above, the monitoring unit 114 uses the leading bit of the GCC0 region as a leading flag bit indicating whether there is an update in the received data. Here, the leading bit is one bit, but alternatively may be two or more bits.

The monitoring unit 114 then sends the received data to the transponder 102 via the optical transmitting unit 113.

The storage unit 115 stores data.

The communication unit 116 transmits and receives data.

Specifically, the communication unit 116 communicates with the paired regenerative relay transponder 110. The paired regenerative relay transponder 110 is a second regenerative relay transponder 110 that transmits and receives optical signals in a direction opposite to the direction in which the optical signals are transmitted and received by a first regenerative relay transponder 110. For example, the regenerative relay transponder paired to the regenerative relay transponder 110A illustrated in FIG. 1 is the regenerative relay transponder 110B.

The communication unit 116 then transmits transmission data, which is data to be sent to the transponder 102 serving as the transmitting device. Specifically, the communication unit 116 is connected to a second regenerative relay transponder 110 that transmits optical signals to the transponder 102 that is the source of the optical signals. The communication unit 116 then transmits transmission data to the transponder 102 via the second regenerative relay transponder 110.

The communication unit 116 receives data that is data to be sent to the transponder 102 serving as the receiving device. The received data is given to the monitoring unit 114. Specifically, the communication unit 116 receives monitoring data, which is data accumulated in the second regenerative relay transponder 110, from a connected second regenerative relay transponder 110.

In the above-described first embodiment, the data accumulation time is set to ten milliseconds, but the data accumulation time can be changed in accordance with the amount of data to be transferred or the update timing.

Although the operation when an abnormality is detected has been described in the first embodiment, the above processing can also be applied when data such as the number of error corrections during regular operation, instead of data on an abnormality, is desired to be transferred to the corresponding transponder 102.

Figure 4A:
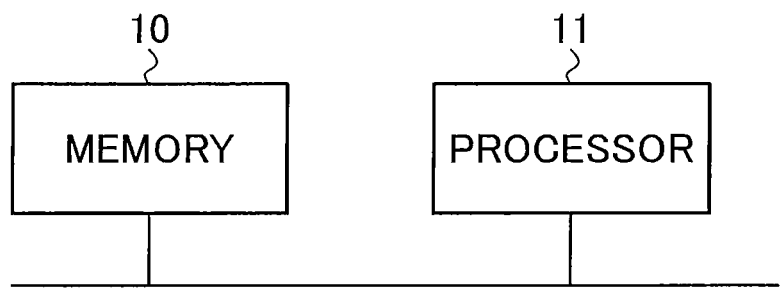
FIGS. 4A and 4B are block diagrams illustrating hardware configuration examples.

A portion or the entirety of the electrical-signal processing unit 112 and the monitoring unit 114 described above can be implemented by, for example, a memory 10 and a processor 11, such as a central processing unit (CPU), that executes the programs stored in the memory 10, as illustrated in FIG. 4A. Such programs may be provided via a network or may be recorded and provided on a recording medium. That is, such programs may be provided as, for example, program products.

Figure 4B:
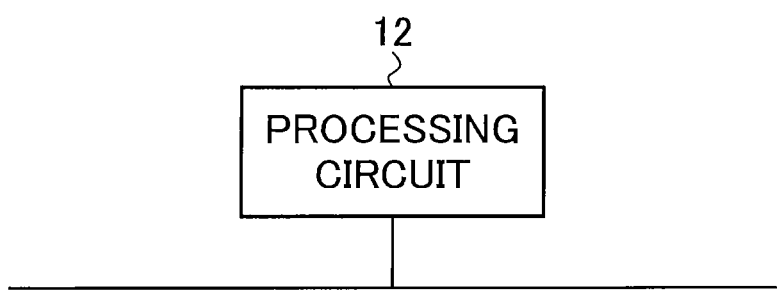

A portion or the entirety of the electrical-signal processing unit 112 and the monitoring unit 114 can be implemented by, for example, a processing circuit 12, such as a single circuit, a composite circuit, a programmed processor, a parallel programmed processor, an application specific integrated circuit (ASIC), or a field programmable gate array (FPGA), as illustrated in FIG. 4B.

As described above, the electrical-signal processing unit 112 and the monitoring unit 114 can be implemented by processing circuitry.

The optical receiving unit 111 and the optical transmitting unit 113 can be implemented by an optical communication interface capable of converting optical signals and electrical signals.

The communication unit 116 can be implemented by a wired or wireless communication interface.

The storage unit 115 can be implemented by a volatile or non-volatile memory.

As described above, by storing data aggregated over a predetermined period by the regenerative relay transponder 110 in the GCC0 data region 121 and using the leading flag bit 120 to report the data update timing, a high-speed monitoring unit is not needed, and a low-speed monitoring unit can be used to contribute to power saving.

Second Embodiment

As illustrated in FIG. 1, a wavelength-division multiplexing system 200 including regenerative relay transponders 210A and 210B according to the second embodiment includes customer client devices 101A and 101B, transponders 102A and 102B, wavelength demultiplexers 103A and 103B, and regenerative relay transponders 210A and 210B.

The customer client devices 101A and 101B, the transponders 102A and 102B, and the wavelength demultiplexers 103A and 103B of the wavelength-division multiplexing system 200 according to the second embodiment are respectively the same as the customer client devices 101A and 101B, the transponders 102A and 102B, and the wavelength demultiplexers 103A and 103B of the wavelength-division multiplexing system 100 according to the first embodiment.

Since the regenerative relay transponders 210A and 210B have the same configuration, each of the regenerative relay transponders 210A and 210B is referred to as a regenerative relay transponder 210 when it is unnecessary to distinguish between them.

As illustrated in FIG. 2, the regenerative relay transponder 210 includes an optical receiving unit 111, an electrical-signal processing unit 112, an optical transmitting unit 113, a monitoring unit 214, a storage unit 115, and a communication unit 116.

The optical receiving unit 111, the electrical-signal processing unit 112, the optical transmitting unit 113, the storage unit 115, and the communication unit 116 of the regenerative relay transponder 210 according to the second embodiment are respectively the same as the optical receiving unit 111, the electrical-Signal processing unit 112, the optical transmitting unit 113, the storage unit. 115, and the communication unit 116 of the regenerative relay transponder 110 according to the first embodiment.

As in the first embodiment, when an abnormality is detected by the electrical-signal processing unit 112, the monitoring unit 214 acquires the data in which the abnormality is detected from the electrical-signal processing unit 112 and stores the data in the storage unit 115. The monitoring unit 214 accumulates data in which an abnormality is detected in the storage unit 115 over a predetermined period.

The monitoring unit 214 then sends the data accumulated over the predetermined period to a paired regenerative relay transponder 210 by using any frame format via the communication unit 116.

When the communication unit 116 receives data that is monitoring data from the paired regenerative relay transponder 210, the monitoring unit 214 causes the optical transmitting unit 113 to transmit the received data.

In the first embodiment, the data to be transmitted to an opposing transponder 102 is stored in a GCC0 region. Also, in the second embodiment, data is stored in a GCC0 region, but in the second embodiment, more data than that in the first embodiment can be stored.

For example, the monitoring unit 214 multiframes received data and stores the multiframed data in the GCC0 region of the OTU frame overhead.

Figure 5:
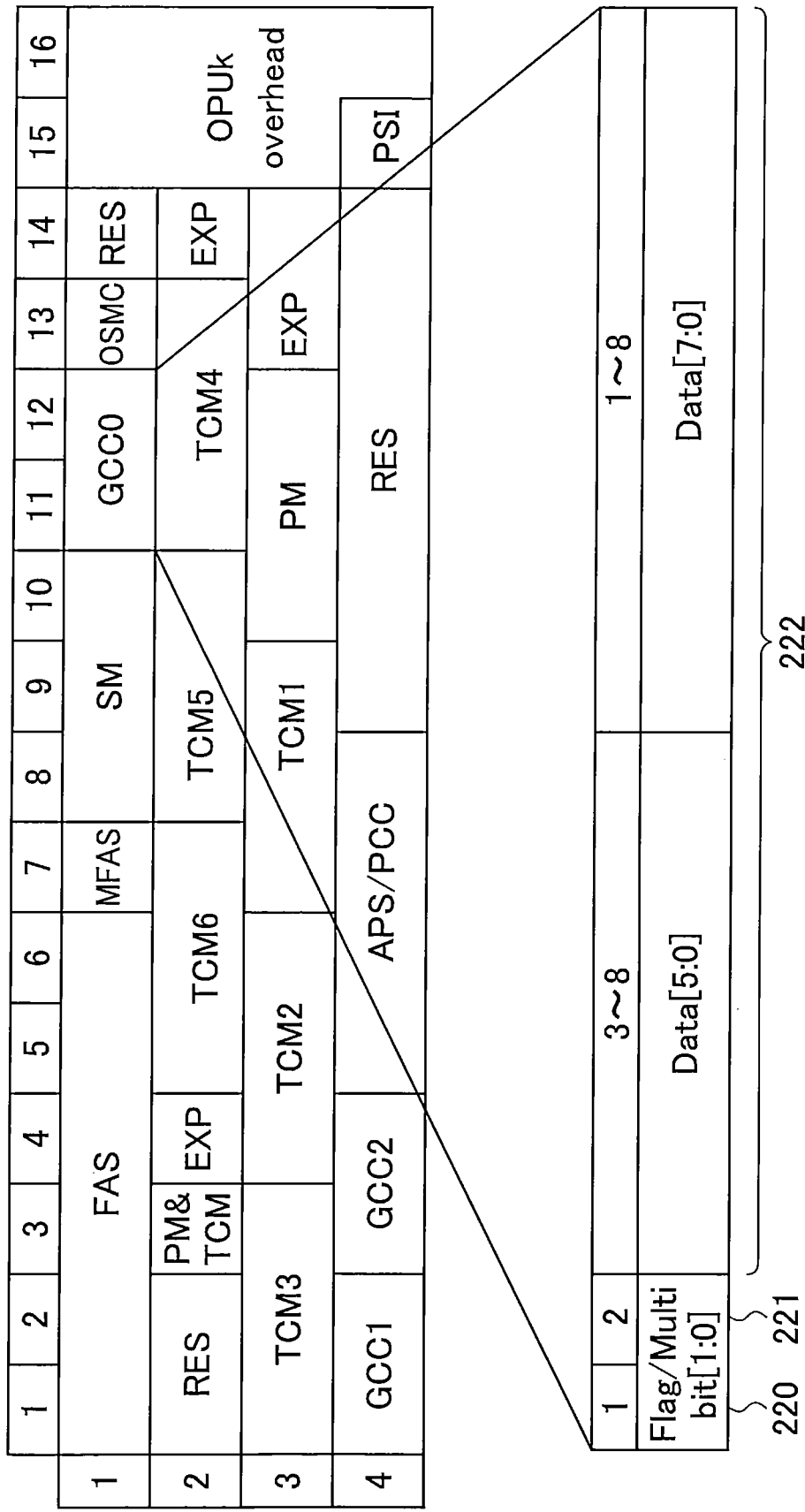
FIG. 5 is a schematic diagram illustrating overhead mapping when a GCC0 region is multiframed.

FIG. 5 is a schematic diagram illustrating overhead mapping when the GCC0 region is multiframed in the second embodiment.

In the second embodiment, a 1-bit leading flag bit 220 and a 1-bit multiframe bit 221 are reserved at the beginning of the bit string.

The data to be transmitted to the transponder 102 is stored in the remaining 14-bit data region 222.

Here, 14 bits of data can be stored when the multiframe bit 221 is set to "0," and 14 bits can be stored when the multiframe bit 221 is set to "1," and as a result, a total of 28 bits of data can be transmitted.

For this reason, when the transponder 102 receives an OTUCn frame while the leading flag bit 220 is set to "1," the transponder 102 can reset the counter and recognize that the stored data has changed.

As described above, the monitoring unit 214 can use the leading bit of the GCC0 region as a leading flag bit indicating whether or not there is an update in the received data and use the bit next to the leading flag bit as a multiframe bit indicating the order of the multiframed data. Here, the leading bit and the multiframe are both one bit, but the number of bits is not limited to "1" and may be two or more.

As described above, in the second embodiment, by multiframing the GCC0 region, more data can be transmitted to the opposing transponder 102 than in the first embodiment.

Although the multiframe bit 221 is one bit in the second embodiment, the number of bits can be increased in accordance with the data to be transmitted to the opposing transponder 102.

Third Embodiment

As illustrated in FIG. 1, a wavelength-division multiplexing system 300 including regenerative relay transponders 310A and 310B according to the third embodiment includes customer client devices 101A and 101B, transponders 102A and 102B, wavelength demultiplexers 103A and 103B, and regenerative relay transponders 310A and 310B.

The customer client devices 101A and 101B, the transponders 102A and 102B, and the wavelength demultiplexers 103A and 103B of the wavelength-division multiplexing system 300 according to the third embodiment are respectively the same as the customer client devices 1012 and 101B, the transponders 102A and 102B, and the wavelength demultiplexers 103A and 103B of the wavelength-division multiplexing system 100 according to the first embodiment.

Since the regenerative relay transponders 310A and 310B have the same configuration, each of the regenerative relay transponders 310A and 310B is referred to as a regenerative relay transponder 310 when it is unnecessary to distinguish between them.

As illustrated in FIG. 3, the regenerative relay transponder 310 includes an optical receiving unit 111, an electrical-signal processing unit 112, an optical transmitting unit 113, a monitoring unit 314, a storage unit 115, and a communication unit 116.

The optical receiving unit 11l, the electrical-signal processing unit 112, the optical transmitting unit 113, the storage unit 115, and the communication unit 116 of the regenerative relay transponder 310 according to the third embodiment are respectively the same as the optical receiving unit 111, the electrical-signal processing unit 112, the optical transmitting unit 113, the storage unit 115, and the communication unit 116 of the regenerative relay transponder 110 according to the first embodiment.

As in the first embodiment, when an abnormality is detected by the electrical-signal processing unit 112, the monitoring unit 314 acquires the data in which the abnormality is detected from the electrical-signal processing unit 112 and stores the data in the storage unit 115. The monitoring unit 314 accumulates data in which an abnormality is detected in the storage unit 115 over a predetermined period.

The monitoring unit 314 then sends the data accumulated over the predetermined period to a paired regenerative relay transponder 310 by using any frame format via the communication unit 116.

When the communication unit 116 receives data that is monitoring data from the paired regenerative relay transponder 310, the monitoring unit 314 causes the optical transmitting unit 113 to transmit the received data.

In the first and second embodiments, the received data is stored in a GCC0 region, but in the third embodiment, the received data is stored in a reserved for future international standardization (RES) region of OTUCn frame overhead.

Here, the monitoring unit 314 multiframes the received data and stores the multiframed data in the RES region of the OTU frame overhead.

Figure 6:
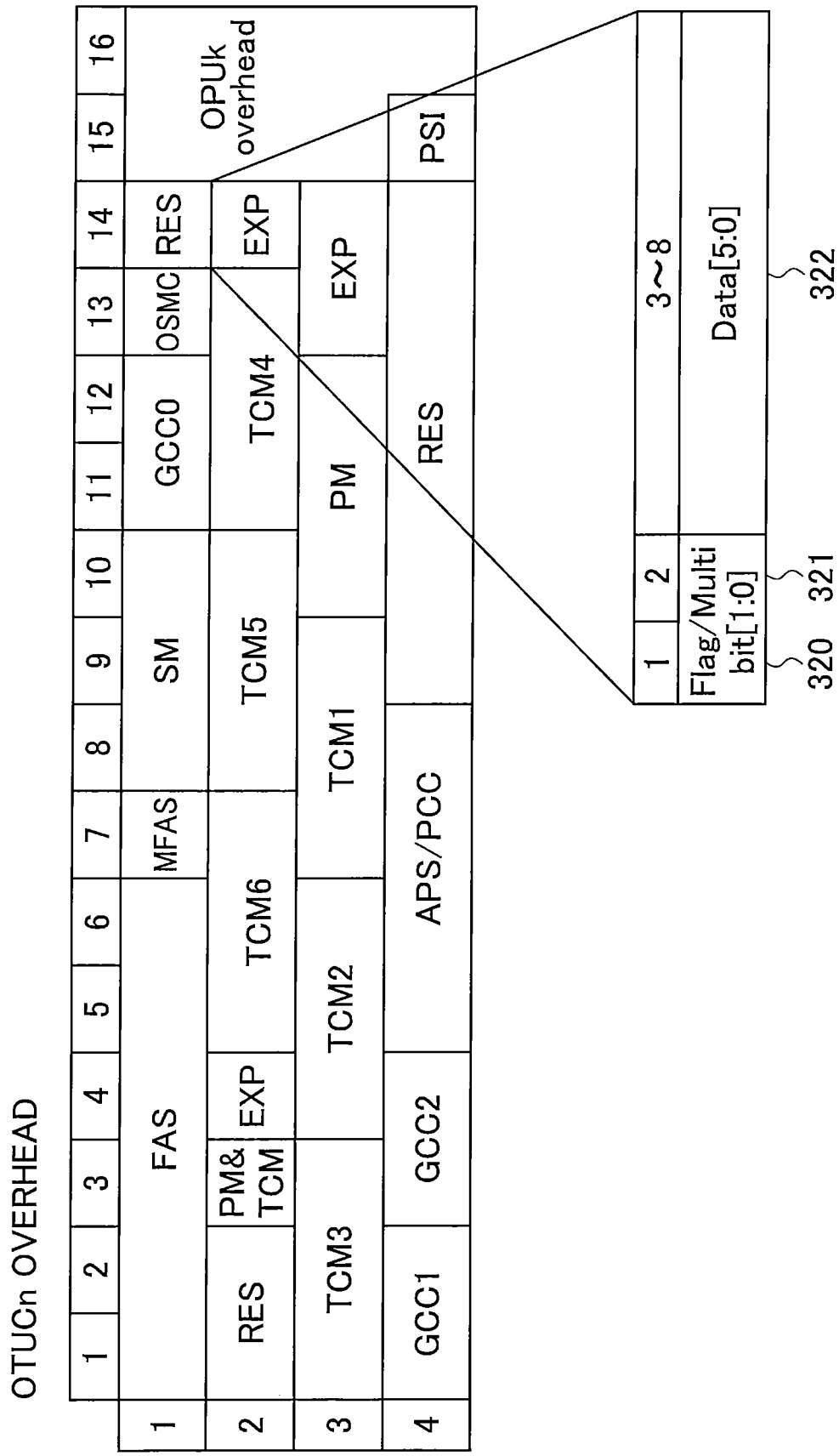
FIG. 6 is a schematic diagram illustrating overhead mapping when a RES region is multiframed.

FIG. 6 is a schematic diagram illustrating overhead mapping when the RES region is multiframed in the third embodiment.

A 1-bit leading flag bit 320 and a 1-bit multiframe bit 321 are reserved at the beginning of a bit string, and the remaining six bits are used as a data region 322 for storing data to be transmitted to a transponder.

A total of 12 bits of data can be stored because six bits of data can be stored when the multiframe bit 321 is set to "0," and six bits can be stored when the multiframe bit 321 is set to "1."

When the multiframe bits are two bits, a total of 20 bits of data can be transferred by using the remaining five bits and changing the multiframe bit 321 to "00," "01," "10," and "11."

For this reason, when the transponder 102 receives an OTUCn frame while the leading flag bit 320 is set to "1," the transponder 102 can reset the counter and recognize that the stored data has changed.

As described above, the monitoring unit 314 uses the leading bit of the RES region as a leading flag bit indicating whether or not there is an update in the received data and uses the bit next to the leading flag bit of the RES region as a multiframe bit indicating the order of the multiframed data. Here, the leading bit is one bit, but alternatively may be two or more bits. The multiframe bits are two bits but alternatively may be one bit or three or more bits.

Here, the RES region is one byte, unlike the GCC0 region. For this reason, the data region 322 is smaller in the third embodiment than in the first and second embodiments using a GCC0 region. However, as described above, by performing multiframing as in the second embodiment, more data can be transmitted.

DESCRIPTION OF REFERENCE CHARACTERS 100, 200, 300 wavelength-division multiplexing system; 101 client device; 102 transponder; 103 wavelength demultiplexer; 110, 210, 310 regenerative relay transponder; 111 optical receiving unit; 112 electrical-signal processing unit; 113 optical transmitting unit; 114, 214, 314 monitoring unit; 115 storage unit; 116 communication unit.

What is claimed is:

1. A repeater comprising:
a first optical communication interface to receive an optical signal from a transmitting device as a reception optical signal and convert the reception optical signal into an electrical signal;
processing circuitry to execute predetermined processing on the electrical signal and to monitor the predetermined processing;
a second optical communication interface to generate a transmission optical signal by converting the electrical signal subjected to the predetermined processing into an optical signal and transmitting the transmission optical signal;
a memory to store data; and
a communication interface to transmit and receive data,
wherein the processing circuitry accumulates in the memory monitoring data over a predetermined period and causes the communication interface to transmit the monitoring data accumulated over the predetermined period as transmission data to the transmitting device, the monitoring data being data indicating a result of the monitoring.

2. The repeater according to claim 1, wherein, when the communication interface receives data, the processing circuitry causes the second optical communication interface to transmit the received data.

3. The repeater according to claim 2, wherein the processing circuitry stores the received data in a general communication channel 0 (GCC0) region of optical transport unit (OTU) frame overhead and causes the second optical communication interface to transmit the stored data.

4. The repeater according to claim 2, wherein the processing circuitry multiframes the received data, stores the multiframed data in a general communication channel 0 (GCC0) region of optical transport unit (OTU) frame overhead, and causes the second optical communication interface to transmit the stored data.

5. The repeater according to claim 3, wherein the processing circuitry uses a leading bit of the GCC0 region as a leading flag bit indicating whether or not there is an update in the received data.

6. The repeater according to claim 4, wherein the processing circuitry uses a leading bit of the GCC0 region as a leading flag bit indicating whether or not there is an update in the received data and uses a bit next to the leading flag bit as a multiframe bit indicating the order of the multiframed data.

7. The repeater according to claim 2, wherein the processing circuitry stores the received data in a reserved for future international standardization (RES) region of optical transport unit (OTU) frame overhead and causes the second optical communication interface to transmit the stored data.

8. The repeater according to claim 2, wherein the processing circuitry multiframes the received data, stores the multiframed data in a reserved for future international standardization (RES) region of optical transport unit (OTU) frame overhead, and causes the second optical communication interface to transmit the stored data.

9. The repeater according to claim 7, wherein the processing circuitry uses a leading bit of the RES region as a leading flag bit indicating whether or not there is an update in the received data.

10. The repeater according to claim 8, wherein the processing circuitry uses a leading bit of the RES region as a leading flag bit indicating whether or not there is an update in the received data and uses a bit next to the leading flag bit of the RES region as a multiframe bit indicating the order of the multiframed data.

11. The repeater according to claim 1, wherein,
the processing circuitry uses the electrical signal to detect presence or absence of an abnormality in communication with the transmitting device, and
causes the memory to store data related to the abnormality as the monitoring data when the abnormality is determined.

12. The repeater according to claim 1, wherein,
the processing circuitry performs error correction on the electrical signal, and
causes the memory to store data related to the error correction as the monitoring data.

13. The repeater according to claim 1, wherein the communication interface is connected to another repeater transmitting an optical signal to the transmitting device and transmits the transmission data to the transmitting device via the another repeater.

14. The repeater according to claim 4, wherein the processing circuitry uses a leading bit of the GCC0 region as a leading flag bit indicating whether or not there is an update in the received data.

15. The repeater according to claim 8, wherein the processing circuitry uses a leading bit of the RES region as a leading flag bit indicating whether or not there is an update in the received data.

16. The repeater of claim 1, wherein:
the processing circuitry causes the communication interface to transmit the monitoring data as transmission data to a second repeater paired with the repeater, and
the second repeater transmits the transmission data to the transmitting device.

17. The repeater of claim 2, wherein:
the processing circuitry stores the received data in an overhead region of an optical transport unit (OTU) frame and causes the second optical communication interface to transmit the stored data.

18. The repeater of claim 17, wherein:
the processing circuitry uses a leading bit of the overhead region as a leading flag bit indicating whether there is an update in the received data.

19. A monitoring method comprising:
receiving an optical signal from a transmitting device as a reception optical signal;
converting the reception optical signal into an electrical signal;
executing predetermined processing on the electrical signal;
generating a transmission optical signal by converting the electrical signal subjected to the predetermined processing into an optical signal;
transmitting the transmission optical signal;
monitoring the predetermined processing;
accumulating monitoring data over a predetermined period, the monitoring data being data indicating a result of the monitoring; and
transmitting the monitoring data accumulated over the predetermined period to the transmitting device as transmission data.

20. The monitoring method of claim 19, wherein:
the transmitting of the monitoring data comprises transmitting the monitoring data to a second repeater paired with a first repeater performing the method, and
the second repeater transmits the monitoring data to the transmitting device.

* * * * *